(12) United States Patent
Wespel et al.

(10) Patent No.: US 10,498,746 B2
(45) Date of Patent: Dec. 3, 2019

(54) CLOUD BASED REPUTATION SYSTEM FOR BROWSER EXTENSIONS AND TOOLBARS

(71) Applicant: Avast Software s.r.o., Prague (CZ)

(72) Inventors: Thomas Wespel, Mietingen (DE); Thomas Salomon, Neukirch (DE)

(73) Assignee: AVAST SOFTWARE S.R.O., Prague (CZ)

( * ) Notice: Subject to any disclaimer, the term of this patent is extended or adjusted under 35 U.S.C. 154(b) by 0 days.

(21) Appl. No.: 14/874,291

(22) Filed: Oct. 2, 2015

(65) Prior Publication Data

US 2016/0099955 A1    Apr. 7, 2016

Related U.S. Application Data

(60) Provisional application No. 62/059,089, filed on Oct. 2, 2014.

(51) Int. Cl.
  *H04L 29/06*    (2006.01)
(52) U.S. Cl.
  CPC ...... *H04L 63/1416* (2013.01); *H04L 63/0236* (2013.01); *H04L 63/145* (2013.01); *H04L 63/1433* (2013.01); *H04L 63/1466* (2013.01)
(58) Field of Classification Search
  CPC ............. H04L 63/1433; H04L 63/145; H04L 63/1466
  USPC ..................................................... 726/23–25
  See application file for complete search history.

(56) References Cited

U.S. PATENT DOCUMENTS

| | | | | |
|---|---|---|---|---|
| 7,370,008 | B1 * | 5/2008 | Hill ...................... | G06F 21/105 705/59 |
| 8,275,672 | B1 * | 9/2012 | Nguyen ............. | G06Q 30/0635 705/26.41 |
| 8,683,585 | B1 * | 3/2014 | Chen ...................... | G06F 21/56 726/22 |
| 8,910,289 | B1 * | 12/2014 | Elliott ................... | G06F 21/554 713/188 |
| 9,027,140 | B1 * | 5/2015 | Watkins ............. | G06Q 30/0277 709/219 |
| 9,135,433 | B2 * | 9/2015 | Green ..................... | G06F 21/51 |
| 9,384,336 | B1 * | 7/2016 | Ashley .................... | G06F 21/30 |
| 9,558,348 | B1 * | 1/2017 | Muttik .................... | G06F 21/51 |
| 9,781,151 | B1 * | 10/2017 | McCorkendale ... | H04L 63/1441 |
| 2001/0014968 | A1 * | 8/2001 | Mohammed ............. | G06F 8/65 717/170 |
| 2004/0218580 | A1 * | 11/2004 | Bahl ..................... | H04W 8/245 370/350 |
| 2006/0075205 | A1 * | 4/2006 | Martin .............. | G06F 17/30887 711/200 |
| 2006/0136745 | A1 * | 6/2006 | Taylor .................... | G06F 21/52 713/187 |
| 2006/0253458 | A1 * | 11/2006 | Dixon ................... | G06Q 30/02 |

(Continued)

*Primary Examiner* — Venkat Perungavoor
*Assistant Examiner* — Peiliang Pan
(74) *Attorney, Agent, or Firm* — Husch Blackwell LLP

(57) ABSTRACT

A method and system for an automated classification rating of browser extensions is provided. One embodiments of the present invention can track the behavior of a large number of users in order to determine the reputation of browser extensions such as toolbars. The rating can be determined based on similarity analysis of previously rated browser extension attributes, and can be adjusted in response to a determination of the user's choice on the browser extension removal and reinstallation.

28 Claims, 5 Drawing Sheets

(56) References Cited

U.S. PATENT DOCUMENTS

| | | | |
|---|---|---|---|
| 2006/0272017 A1* | 11/2006 | Largman | G06F 11/1417 726/22 |
| 2007/0061180 A1* | 3/2007 | Offenberg | G06Q 10/06 705/7.22 |
| 2007/0226062 A1* | 9/2007 | Hughes | G06Q 30/02 705/14.14 |
| 2011/0029577 A1* | 2/2011 | Notani | G06F 16/252 707/804 |
| 2011/0145435 A1* | 6/2011 | Bhatawdekar | G06F 21/566 709/238 |
| 2011/0145926 A1* | 6/2011 | Dalcher | G06F 11/3466 726/26 |
| 2011/0191849 A1* | 8/2011 | Jayaraman | H04L 63/1416 726/23 |
| 2012/0240236 A1* | 9/2012 | Wyatt | G06F 21/564 726/25 |
| 2013/0097660 A1* | 4/2013 | Das | H04L 63/10 726/1 |
| 2013/0254880 A1* | 9/2013 | Alperovitch | G06F 21/51 726/22 |
| 2013/0347094 A1* | 12/2013 | Bettini | H04L 63/0245 726/11 |
| 2014/0173561 A1* | 6/2014 | Toub | G06F 8/73 717/123 |
| 2014/0245292 A1* | 8/2014 | Balani | G06F 9/5077 718/1 |
| 2015/0007330 A1* | 1/2015 | Gomez | G06F 21/577 726/25 |
| 2015/0067827 A1* | 3/2015 | Lim | G06F 21/32 726/19 |
| 2015/0106940 A1* | 4/2015 | Borghetti | G06F 21/577 726/25 |
| 2015/0163362 A1* | 6/2015 | Dickins | H04M 3/569 379/202.01 |
| 2016/0042285 A1* | 2/2016 | Gilenson | G06N 5/046 706/47 |
| 2016/0099955 A1* | 4/2016 | Wespel | H04L 63/1416 726/23 |
| 2016/0099963 A1* | 4/2016 | Mahaffey | H04L 63/0227 726/25 |
| 2016/0294846 A1* | 10/2016 | Sharov | G06F 21/51 |

* cited by examiner

US 10,498,746 B2

CLOUD BASED REPUTATION SYSTEM FOR BROWSER EXTENSIONS AND TOOLBARS

RELATED APPLICATION

This application claims the priority benefit of U.S. Provisional Application 62/059,089 filed Oct. 2, 2014. The disclosure of the above-referenced application is incorporated herein by reference in its entirety.

FIELD OF THE INVENTION

The disclosure relates generally to systems and methods for removing malware, and more particularly, to a cloud based system for assessing a reputation for browser extensions and toolbars, and removing browser malware in accordance with the reputation of a browser extension or toolbar.

BACKGROUND

The Internet is a worldwide public system of computer networks providing information, shopping capabilities and other kinds of business opportunities accessible to tens of millions of people worldwide. The most widely used part of the Internet is the World Wide Web, often abbreviated "WWW" or simply referred to as just "the web." The web is an Internet service that organizes information through the use of hypermedia. The HyperText Markup Language ("HTML") is typically used to specify the contents and format of a hypermedia document (e.g., a web page). Other popular formats to display contents of a web page are JAVA™, the Portable Document Format (PDF), AJAX, Adobe Flash or Microsoft Silverlight. Hypertext links refer to other documents by their uniform resource locators (URLs). A client program, known as a browser, e.g. MICROSOFT® INTERNET EXPLORER®, GOOGLE® CHROME®, MOZILLA® FIREFOX®, APPLE® SAFARI®, runs on the user's computer and is used to render the content of a web page and display it in human readable form. The browser is also used to follow a link, e.g., send a query to the web server.

Browser extensions are small programs that extend the default functionality of the browsers. Such extensions can help a user to manage his passwords for the access of different websites that require a password (single sign on), to block ads or ad tracking services or to display the reputation of search results. A browser extension may provide a toolbar on the browser user interface.

Browser extensions initially provided useful features or customizations to browsers. However, browser extensions have been misused in an increasing scale over the last years. For example, many extension authors started to use extensions in order to collect private information or to hijack the browser settings for homepage and search provider in order to earn money. Many of these unwanted extensions are not actively searched for and installed by a user, but instead come bundled with other software a user wants to install and are typically offered as an opt-out to the desired software.

A large number of these undesirable browser extensions come as opt-out offers bundled together with valuable software and behave in a similar manner to other known forms of malware, but they come with an end-user license agreement (EULA). Therefore it is difficult for a conventional anti-virus program to flag these bundled applications as malware.

BRIEF DESCRIPTION OF THE DRAWINGS

For a better understanding of the inventive subject matter, reference may be made to the accompanying drawings in which.

DETAILED DESCRIPTION

Figure 1:
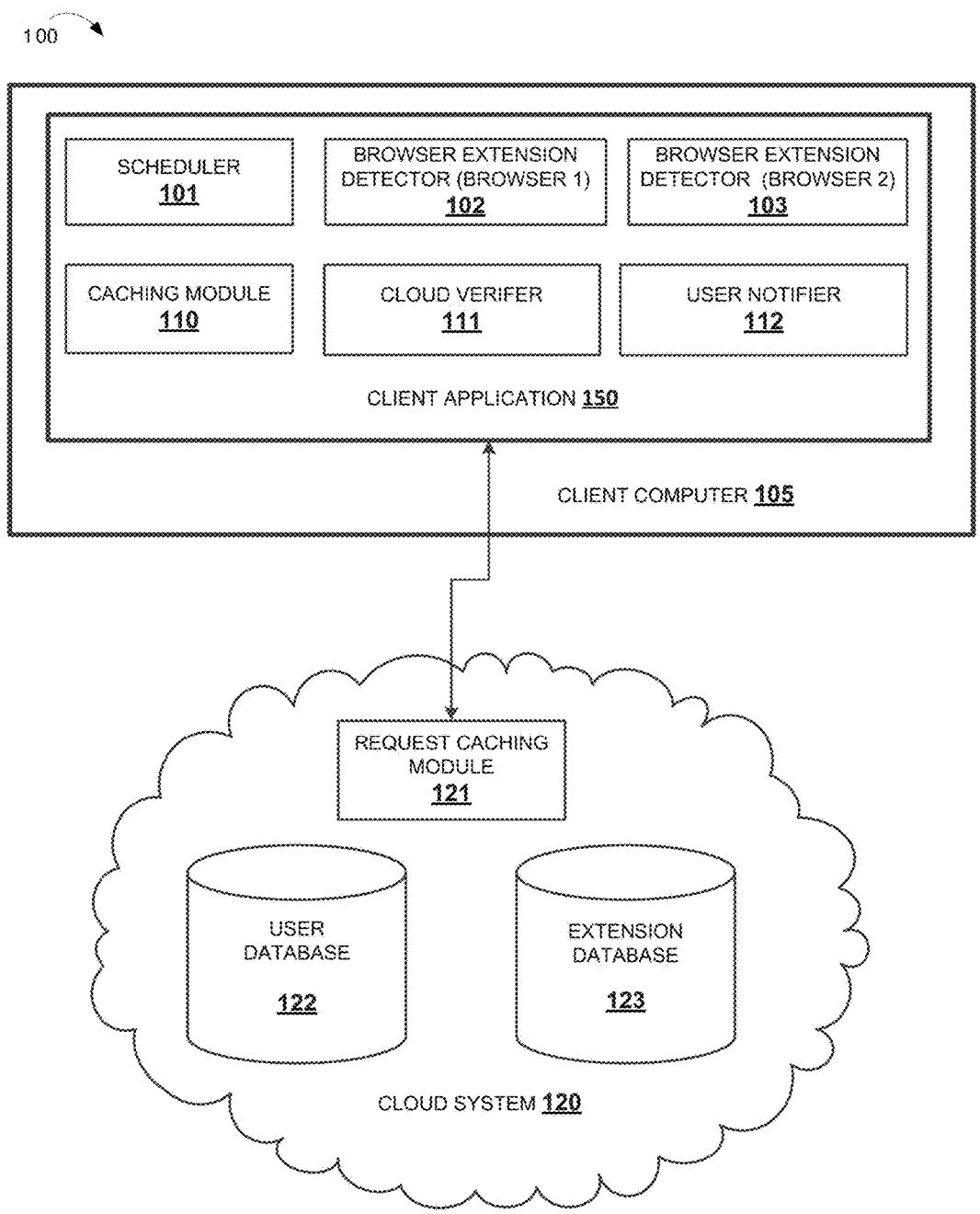
FIG. 1 is a block diagram of a system including client and backend systems for analyzing browser extensions according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure includes systems and methods to detect browser hijackings. The disclosed embodiments can track the behavior of a large number of users in order to determine the reputation of browser extensions such as toolbars. Some embodiments combine various characteristics of different extensions or toolbars for comparison in order to group the extensions or toolbars into families. This can be desirable because some of the extensions or toolbars can be polymorphic like typical malware (i.e., they are modified to appear as different samples after each few installations) or use well known brand names like "facebook" or "ebay" in order to avoid a removal by the user.

FIG. 1 is a block diagram of a system 100 including client and backend systems for analyzing browser extensions and toolbars according to embodiments. In some aspects, the system 100 includes a client computer 105 and a cloud system 120. The client computer 105 can be a typical computer running a Microsoft Windows, Apple Macintosh or any other operating system. The computer can have one or more different browsers. Examples of such browsers may include Microsoft Internet Explorer, Google Chrome, Mozilla FireFox, Apple Safari etc. The embodiments are not limited to any particular type or brand of browser. Client computer 105 may include a client application 150, which can include a scheduler 101, a browser extension detector (e.g. detector 102 and 103), a caching module 110, a cloud verifier 111 and user notifier 112. It should be noted that any or all of the scheduler 101, the browser extension detector 102, the browser extension detector 103, caching module 110, the cloud verifier 111 and the user notifier 112 may be a routine within client application 150, a thread associated with a process for application 150, or they may be provided as a separate program for execution with client application 150.

The client application 150 can be either installed on a computer 105 of an end users or it can be run on a one time basis (for example, downloaded from a web site to a temporary location on the computer 105 and run). When installed a scheduler module 101 can be used to start the application in adjustable time intervals, e.g. each day, each hour, on each start of a supported browser etc. The scheduler module 101 can cause the browser extension detection modules 102, 103 . . . (one module per supported browser) to run in order to collect information about installed browser extensions on client computer 105. Such information can consist of an ID of the extension, the author, the name, the rights the extension asks for, the type of the extension, digital signatures used by the extension, a manifest file for the extension and various other information that can be collected. Such information may vary between different browser types. Different browser extension detectors 102, 103 may be installed depending on the type of browsers installed on a system.

After the browser extension detection modules have collected information, the collected information can be compared against previously collected information stored in the caching module 110. The caching module 110 can be used to reduce the amount of requests to a server or servers on the backend cloud system 120. If no changes since the last scan are detected, then in some aspects, client application 150 doesn't request reputation data from the cloud system 120 unless the cache interval is reached. If either a new and so far unrated extension is detected or if the cache interval has expired, then client application 105 can establish a connection through the Internet to the cloud system 120. The client verification module 111 can then request a rating for installed browser extensions.

Figure 4:
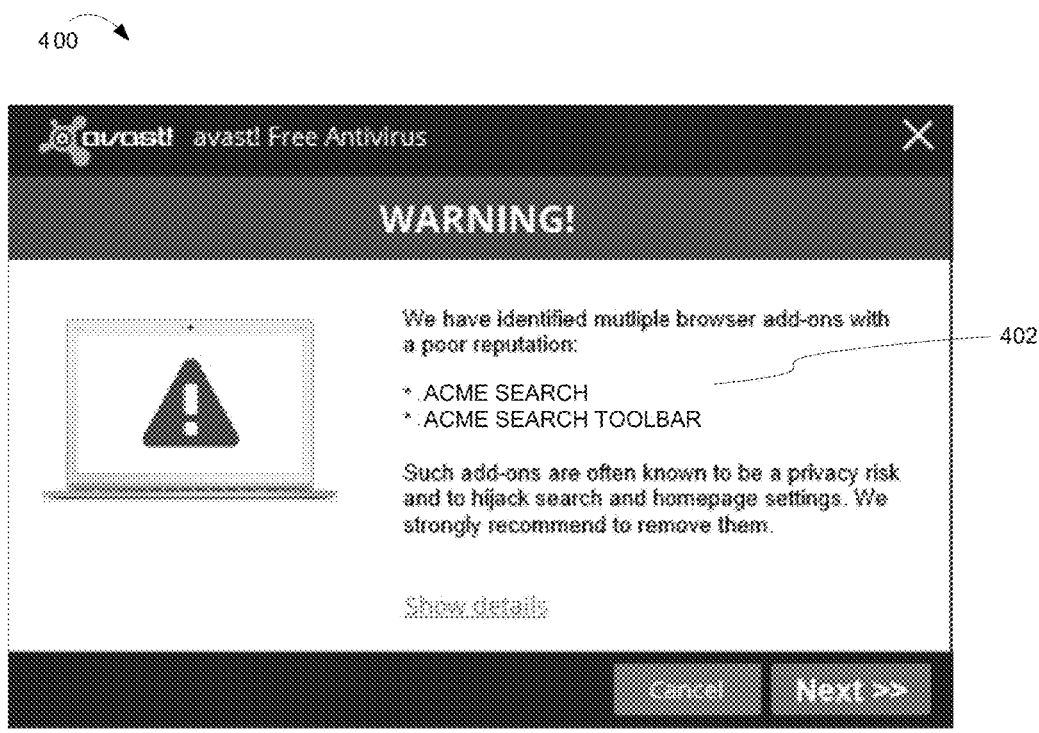
FIG. 4 provides an example user interface according to embodiments.

The cloud system 120 can include a request caching module 121. The request caching module, in some implementations, can access an extension database 123 which contains information about a given browser extension. Examples of such information that may be maintained in extension database 123 can include combinations of one or more of an extension ID, author information regarding the extension that can be collected by the browser extension detection modules 102, 103, and statistical information like the "first seen" date, an installation counter or a removal counter and a rating that is described below with respect to FIG. 2. The extension database 123 can also contain a collected sample of the binary file of a browser extension. In addition to extension database 123, request caching module 121 can access user database 122. User database 122 can include records for individual users of the system. The user database 122 can be used to build a history for each client. User database 122 can store information for individual installed browser extensions, the settings for homepage and search provider and the default browser. Information stored in the user database 122 can be used by the scoring system described below with reference to FIG. 2. For each found browser extension, the cloud system 120 can provide a reputation score. In some implementations, if the reputation score is below a trigger value, the user notification module 112 can notify the user that a potentially harmful extension has been detected and can offer to remove the identified browser extension using a user interface, an example of which is shown in FIG. 4.

FIG. 1 and the description above have been provided in the context of cloud system 120 providing certain functionality. Alternative implementations may provide the functionality described above in different ways. For example, in some aspects, the functionality of cloud system 120 may be provided in a server such as an enterprise server (not shown). Information provided to an enterprise server may comprise information from computers within an enterprise and thus may be more limited than that available to cloud system 120. In alternative aspects, a multi-tiered system may be used in which an enterprise server receives information about computers within the enterprise and may also receive statistical information from cloud system 120. In this case, the enterprise system can prevent information regarding enterprise employees from being sent to the cloud system, but can receive the benefit of the statistical analysis of a larger population that can be provided by cloud system 120.

Figure 2:
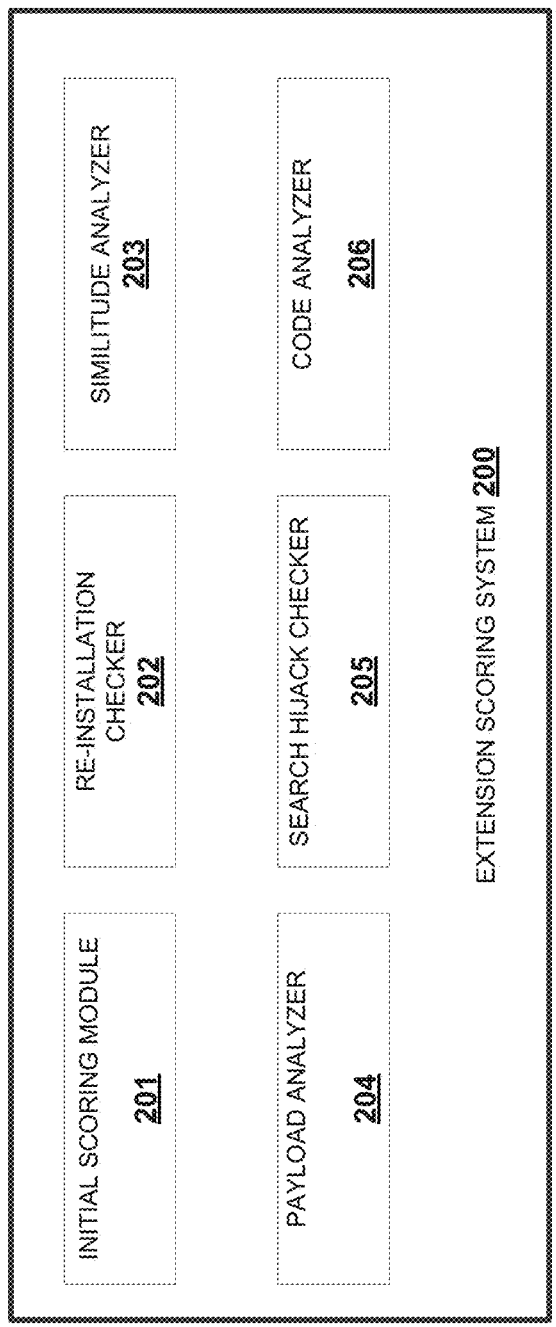
FIG. 2 is a block diagram illustrating an example scoring system used to suggest a rating for a browser extension according to embodiments.

FIG. 2 is a block diagram illustrating an example scoring system 200 used to suggest a rating for a particular browser extension according to aspects of the inventive subject matter. The extension scoring system 200 can provide ratings for reported browser extensions. The initial scoring for a browser extension that has not been analyzed before can done by the initial scoring module 201. In some aspects, the initial scoring can be determined based on statistical methods and the use of one or more white-lists and black-lists. If the extension doesn't fall into a given list, the initial scoring module 201 can request an upload of the binary files and the starting environment (e.g., the installed Windows drivers and services, autorun files, autostarted files etc.) associated with the extension. Once these files are collected, the code analyzer 206 can extract various information items regarding the extension. In some aspects, the information can be represented as "flags" that can be used to determine an initial rating. Such flags can include combinations of one or more attributes of the extension, such as "injects into pages", "redirect URLs" or "communicates with host X". The extracted flags can be stored in the extension database 123 (FIG. 1). In the case of a newly found extension, attributes of the newly found extension can be compared with attributes of previously analyzed extension. For example, assume that an extension has attribute "communicates with host stolendata.org" and that there are another 95 extensions communicating with the same host and all 95 known extensions have a poor reputation. The initial scoring module 201 can assign a poor rating to the newly found extension. Further, if the initial scoring module finds a digital signature of "GoodCompany" in the new extension and there are 9 other extensions with the same flag or attribute and all have a good reputation, the initial reputation can be set to a good rating in some aspects. A rating can be a numerical value (e.g., 1-100), a letter grade, or some other value that can be used to assign a rating.

The re-installation checker 202 can follow client computers where a user has removed a poorly rated browser extension due to a recommendation provided by the system. If the same user installs the same browser extension again manually, the re-installation checker 202 can increase the score of the given browser extension.

The similitude analyzer 203 can actively search the extension database 123 for browser extensions that behave in a similar manner or that belong to the same family (e.g., same malware family). In some aspects, similarity can be detected by analyzing the host or hosts that the extension communicates with. This can be a useful analysis because the extension can be polymorphic with thousands or even millions of variants, but the number of registered DNS names or IP-addresses used by the extension authors is typically much more limited. The similitude analyzer 203 can use these limitations as well as other indicators of similarity, such as coding styles (e.g., the names of variables) inside the binary files to identify browser extensions that malware authors try to hide using polymorphism. Code analyzer 206 can be used to determine coding style attributes.

The payload analyzer 204 investigates the payload of a given browser extension to determine a behavior of the extension. In some aspects, the payload analyzer 204 determines if the extension is intended by the authors of the extension to obtain revenue in ways that are not obvious to, or approved by, the end user or are not the primary use of the browser extension. Examples of such behaviors include ad injection, user profiling, and affiliate hacking, each of which are further described below.

Ad Injection

The type of browser extension places ads into 3rd party webpages, for example, as popup or pop-under ads when certain webpages are opened. In addition, this type of browser extension may replace existing ads meant to appear on webpages with others that are used to earn money for the browser extension author.

The payload analyzer 204 can search for known methods of ad injection and it can collect the websites that are targeted. For example, the payload analyzer 204 can determine that a certain browser extension is placing additional ads when particular websites (e.g., www.amazon.com or www.ebay.com) are opened in the browser.

User Profiling

This type of browser extension can create user profiles by tracking the web pages visited by a user and the click behavior of the user on the web page. Additionally, this type of browser extension may access a user's profile on a social media site (e.g., Facebook®, Linkedin® or the like) or other site that has a user profile. The data collected by the browser extension is then typically sold by the authors of the browser extension. The payload analyzer can analyze the payload data to determine the monitored actions and the network addresses of the backend servers that the extension communicates with and that are collecting the data.

Affiliate Hijacking

Many online stores run affiliate campaigns. An affiliate campaign can be used to provide a revenue-share model for content providers that are "partners" with the affiliate campaign. Typically each partner receives a unique ID that is used to track the revenue created by each partner. An affiliate hijacker browser extension can actively search for sites where they have an affiliate ID and place that affiliate ID whenever there is otherwise no ID or an ID of another provider. The payload analyzer 204 can determine the monitored sites and the server addresses of any backend systems that provide control data for the extension.

Various detection methods can use various technologies to analyze the browser extension to determine whether the extension fits one of the above-described extension types or behaviors. For example, the payload analyzer 204 can analyze the browser extension binary code (e.g. searching for URLs, HTML specific code or other signatures). Further, the payload analyzer can run the browser extension in a virtualized environment (e.g., a sandbox) after the browser extension has been uploaded to the cloud system 120. Still further, a manual analysis by an engineer can be performed to determine the browser extension type.

The Search Hijack Checker 205 can determine whether a browser extension is bundled with a hijacking of the settings for homepage and/or search provider of a browser. This is often the case with browser extensions that are rated with a value indicating the extension has a poor reputation. Search hijack checker 205 can check the user database 122 for entries where the given browser extension has been added and then can compare the settings for the homepage and search provider before the extension has been added and after the extension has been added. If a statistically relevant number of clients reported a change of the search or homepage settings, then the host that is set as the home page or search provider together with the browser extension can be stored as flag or attribute in the extension database 123 and the scoring for the browser extension can be decreased.

Figure 3:
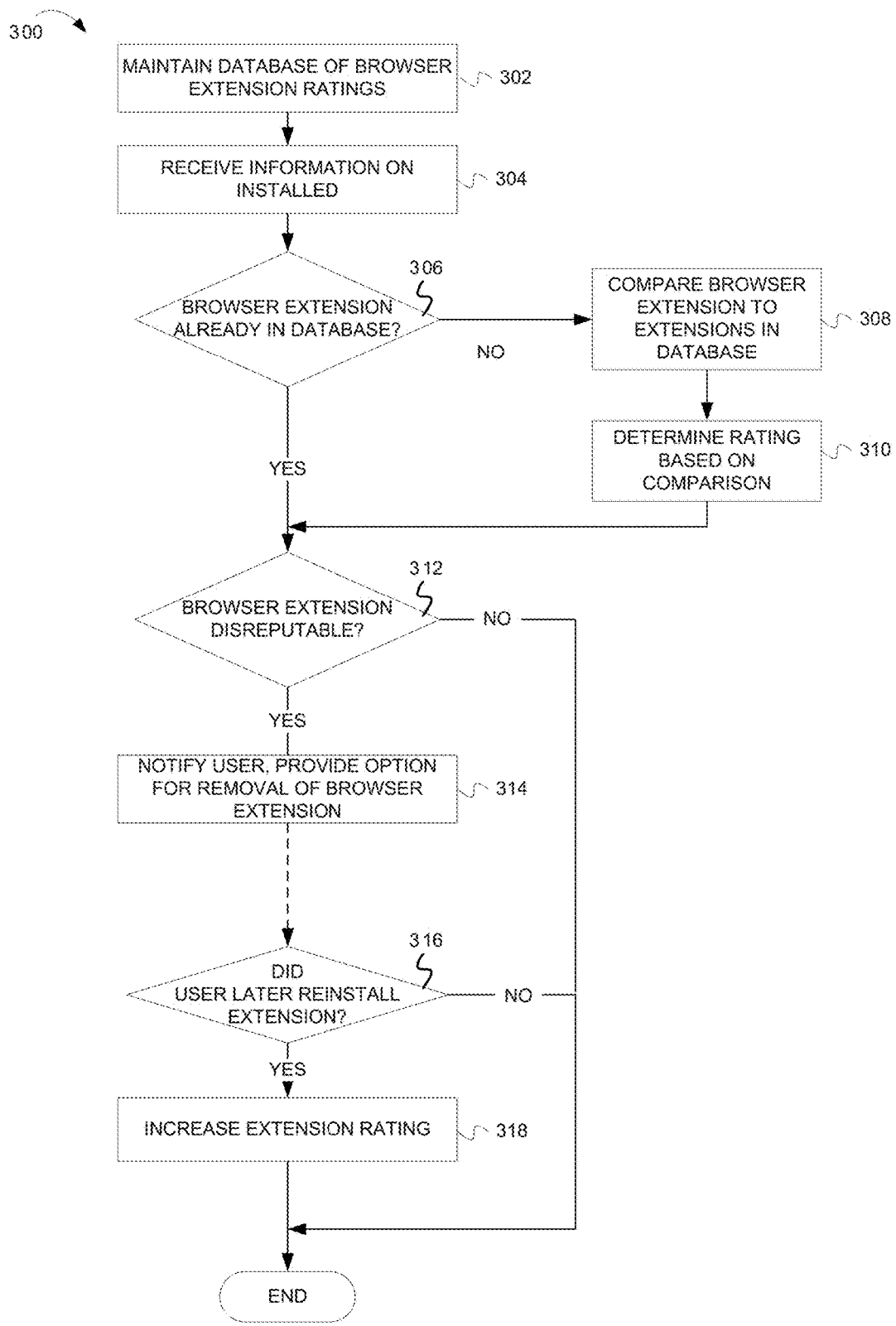
FIG. 3 is a flowchart illustrating example operations for a method for rating a browser extension according embodiments.

FIG. 3 is a flowchart 300 illustrating example operations for a method for rating a browser extension according embodiments. At block 302, a system maintains a database of information associated with browser extensions. For example, an extension database 123 as described above can be maintained.

At block 304, information on a browser extension is received. The information can be received in response to a browser being installed on a computer. Alternatively, the information can be received in response to a scan of a computer for browser extensions. The information can include an extension identifier, an author for the extension, URLs referenced by the extension etc.

At block 306, a check is made to determine if the browser extension is already in a set of browser extensions that have been rated. For example an extension ID can be used to determine if the browser extension is already in the database.

If the check at block 306 determines that the browser extension is in the set of browser extensions already in the database, then the method proceeds to block 312. If the browser extension is not already in the database, then the method proceeds to block 308.

At block 308, attributes of the browser extension being analyzed are compared to attributes of browser extensions in the database to determine similarity between the browser extension being analyzed and previously rated browser extensions. As indicated above, the attributes that are compared may be URLs referenced in or by the extensions, authors of the extensions, network addresses used by the extensions etc.

At block 310, a rating can be determined for the extension being analyzed based on the similarity of its attributes with the attributes of previously rated browser extensions.

If there are no extensions that have attributes similar to the browser extension being analyzed, the as noted above, the method can request an upload of the binary files and the starting environment (e.g., the installed Windows drivers and services, autorun files, autostarted files etc.). The requested information can be analyzed and various attributes determined from the extension and requested information. Such attributes include one or more attributes of data indicating the extensions "injects into pages", "redirect URLs" or "communicates with host 'X'".

At block 312 the rating of the browser extension being analyzed is used to determine if the browser extension is disreputable (i.e., it is likely malware).

If the check at block 312 determines that the browser extension being analyzed has a rating that indicates it is not likely to be malware, then the method terminates.

If the check at block 312 indicates that the browser extension is disreputable, (i.e., it is likely to be malware), then at block 314, the user is notified and can be provided the option to remove the browser extension.

FIG. 4 illustrates an example user interface 400 notifying the user of a disreputable browser extension, and providing the option for the user to remove the browser extension via a button 402. It will be appreciated that alternative user interface elements could be used to notify and provide an option to remove a disreputable browser extension.

Returning to FIG. 3, at a point in time after removal of a browser extension according to the above-described operations, at block 316, a system executing the method may check to determine if the user reinstalled the browser extension. If the user did reinstall the browser extension, a rating of the browser extension may be increased on the assumption that if a user chooses to reinstall a browser extension, it is less likely that the browser extension is disreputable.

Figure 5:
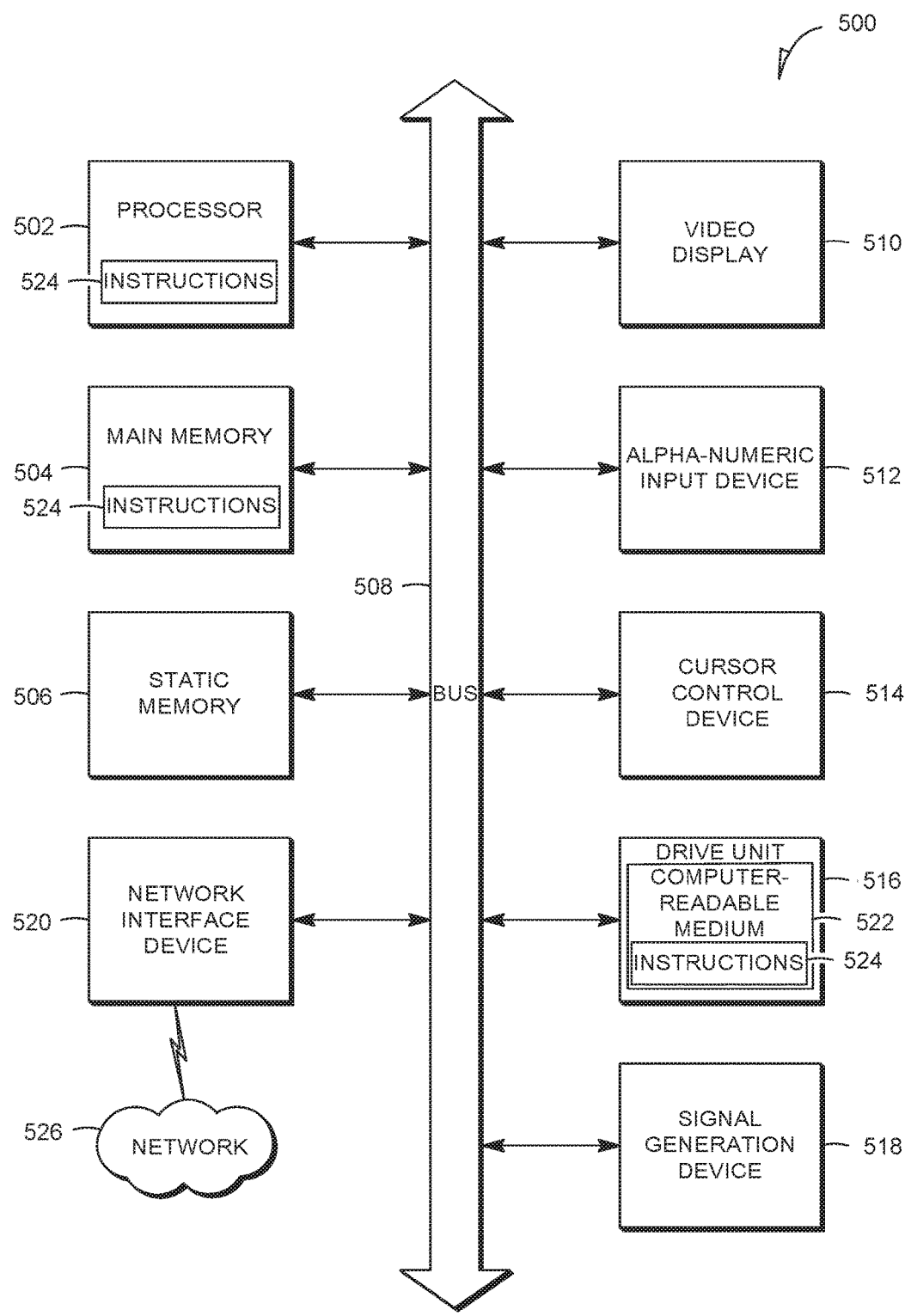
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to both servers and/or remote clients.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for rating a browser extension, the computer-implemented method comprising steps of:

receiving into a machine readable medium an indication that the browser extension has been installed;

receiving into the machine readable medium one or more binary files of the browser extension and a starting environment of the browser extension, wherein the starting environment comprises drivers and services, autorun files, and autostarted files;

collecting, by one or more processors, first information associated with the browser extension, wherein said collecting comprises executing, in a virtualized environment, the received binary files of the browser extension in the received starting environment;

storing, by the one or more processors, the first information into the machine readable medium;

comparing, by the one or more processors, the first information associated with the browser extension with second information associated with one or more previously rated browser extensions;

determining that the browser extension performs ad injection when the browser extension places advertisements when websites are opened in the browser;

determining when the browser extension performs user profiling by analyzing payload data to determine monitored actions and network addresses of backend servers with which the browser extension communicates;

determining when the browser extension performs affiliate hijacking by determining the network addresses of backend servers providing control data for the browser extension;

configuring, by the one or more processors, a rating for the browser extension in accordance with the comparing, the determining that the browser extension performs ad injection, the determining when the browser extension performs user profiling, and the determining when the browser extension performs affiliate hijacking;

determining, by the one or more processors, whether the browser extension is disreputable based on the configured rating thereof;

providing a graphical user interface element to remove the browser extension in response to determining that the browser extension is disreputable;

determining whether the browser extension was reinstalled after having been removed in response to selection of the provided graphical user interface element; and increasing the rating for the browser extension in response to determining that the browser extension was reinstalled.

2. The computer-implemented method of claim 1, wherein collecting the first information includes collecting one or more of an extension identifier, an extension author, and a uniform resource locator (URL) in the extension.

3. The computer-implemented method of claim 1, wherein configuring, by the one or more processors, the rating for the browser extension includes determining whether the browser extension has the same extension identifier as any of the one or more previously rated browser extensions.

4. The computer-implemented method of claim 1, wherein the browser extension comprises a toolbar extension.

5. The computer-implemented method of claim 1, wherein comparing, by the one or more processors, the first information associated with the browser extension includes comparing a URL associated with the browser extension with one or more URLs associated with any of the one or more previously rated browser extensions.

6. The computer-implemented method of claim 1, wherein configuring the rating for the browser extension includes configuring the rating according to statistical information for at least one of the one or more previously rated browser extensions.

7. The computer-implemented method of claim 1, wherein comparing the first information associated with the browser extension with the second information associated with the one or more previously rated browser extensions includes determining whether the browser extension contains a reference to a same URL as any of the one or more previously rated browser extensions.

8. The computer-implemented method of claim 1, wherein comparing the first information associated with the browser extension includes determining if first executable code of the browser extension refers to one or more of the same variable names referred to by second executable code of any of the one or more previously rated browser extensions.

9. The computer-implemented method of claim 1, further comprising the steps of:
retrieving, from a user database, information for the browser extension, wherein the information for the browser extension comprises settings of a homepage or search provider and a default browser of a user associated with the browser extension;
analyzing a variation of the settings of the homepage or search provider based on the browser extension installation;
determining whether the browser extension was bundled with a homepage or search hijacker; and
adjusting the rating for the browser extension in response to determining that the browser extension was installed with the homepage or search hijacker.

10. The computer-implemented method of claim 1, further comprising the steps of:
notifying and providing a user with an option of removing the browser extension if a reputation score for the browser extension is below a trigger value.

11. The computer-implemented method of claim 1, wherein comparing, by the one or more processors, the first information associated with the browser extension includes determining if the browser extension communicates with a device having a host name or Internet Protocol address used by any one of the previously rated browser extensions to communicate with the device.

12. The computer-implemented method of claim 1, further comprising the step of:
providing the browser extension to an analysis server in response to determining that the browser extension has not been analyzed by the analysis server.

13. A system for rating a browser extension comprising:
one or more processors communicably coupled with a network cloud and servers; and
a non-transitory machine-readable medium having stored thereon machine executable instructions that, when executed, cause the one or more processors to:
receive an indication that a browser extension has been installed,
receive one or more binary files of the browser extension and a starting environment of the browser extension, wherein the starting environment comprises drivers and services, autorun files, and autostarted files,
collect first information associated with the browser extension by executing, in a virtualized environment, the received binary files of the browser extension in the received starting environment,
store the first information into the machine-readable medium,
compare second information of the browser extensions being installed with the first information of the browser extensions previously have stored in the machine readable medium,
determine that the browser extension performs ad injection when the browser extension places advertisements when websites are opened in the browser,
determine when the browser extension performs user profiling by analyzing payload data to determine monitored actions and network addresses of backend servers with which the browser extension communicates,
determine when the browser extension performs affiliate hijacking by determining the network addresses of backend servers providing control data for the browser extension,
configure a rating for the browser extension in accordance with the comparison, the determination that the browser extension performs ad injection, the determination when the browser extension performs user profiling, and the determination when the browser extension performs affiliate hijacking,
determine whether the browser extension is disreputable based on the configured rating thereof,
provide a graphical user interface element to remove the browser extension in response to determining that the browser extension is disreputable,
determine whether the browser extension was reinstalled after having been removed in response to selection of the provided graphical user interface element, and
increase the rating for the browser extension in response to a determination that the browser extension was reinstalled.

14. The system of claim 13, wherein the first information includes one or more of an extension identifier, an extension author, and a uniform resource locator (URL) in the extension.

15. The system of claim 13, wherein the rating comprises a determination that the browser extension does not have the same extension identifier as any of the one or more previously rated browser extensions.

16. The system of claim 13, wherein the browser extension comprises a toolbar extension.

17. The system of claim 13, wherein the machine executable instructions to compare the second information of the browser extension include machine executable instructions to compare a URL associated with the browser extension with one or more URLs associated with the previously rated browser extensions.

18. The system of claim 13, wherein the machine executable instructions to configure the rating for the browser extension include machine executable instructions to configure the rating according to statistical information for the at least one of the one or more previously rated browser extensions.

19. The system of claim 13, wherein the machine executable instructions to compare the second information associated with the browser extension with the first information associated with one or more previously rated browser extensions include machine executable instructions to determine whether the browser extension contains a reference to a same URL as one of the previously rated browser extensions.

20. The system of claim 13, wherein the machine executable instructions to compare information associated with the browser extension include machine executable instructions to determine if first executable code of the browser extension refers to one or more of the same variable names referred to by second executable code of one of the previously rated browser extensions.

21. A non-transitory machine-readable medium having stored thereon machine executable instructions that, when executed, cause one or more processors to:
receive an indication that a browser extension has been installed,
receive one or more binary files of the browser extension and a starting environment of the browser extension, wherein the starting environment comprises drivers and services, autorun files, and autostarted files,
collect first information associated with the browser extension, wherein said collecting comprises executing, in a virtualized environment the received binary files of the browser extension in the received starting environment,
store the first information into the machine-readable medium,
compare second information of the browser extensions being installed with the first information of the browser extensions previously stored in the machine readable medium,
determine that the browser extension performs ad injection when the browser extension places advertisements when websites are opened in the browser,
determine when the browser extension performs user profiling by analyzing payload data to determine monitored actions and network addresses of backend servers with which the browser extension communicates,
determine when the browser extension performs affiliate hijacking by determining the network addresses of backend servers providing control data for the browser extension,
configure a rating for the browser extension in accordance with the comparison, the determination that the browser extension performs ad injection, the determination when the browser extension performs user profiling, and the determination when the browser extension performs affiliate hijacking,
determine whether the browser extension is disreputable based on the configured rating thereof,
provide a graphical user interface element to remove the browser extension in response to determining that the browser extension is disreputable,
determine whether the browser extension was reinstalled after having been removed in response to selection of the provided graphical user interface element, and
increase the rating for the browser extension in response to determining that the browser extension was reinstalled.

22. The non-transitory machine-readable medium of claim 21, wherein the first information includes one or more of an extension identifier, an extension author, and a uniform resource locator (URL) in the extension.

23. The non-transitory machine-readable medium of claim 21, wherein the rating comprises a determination that the browser extension does not have the same extension identifier as any of the one or more previously rated browser extensions.

24. The non-transitory machine-readable medium of claim 21, wherein the browser extension comprises a toolbar extension.

25. The non-transitory machine-readable medium of claim 21, wherein the machine executable instructions to compare the second information of the browser extension include machine executable instructions to compare a URL associated with the extension with one or more URLs associated with the previously rated browser extensions.

26. The non-transitory machine-readable medium of claim 21,
wherein the machine executable instructions to determine the rating for the browser extension include machine executable instructions to determine the rating according to statistical information for the at least one of the one or more previously rated browser extensions.

27. The non-transitory machine-readable medium of claim 21, wherein the machine executable instructions to compare information associated with the browser extension with the second information associated with one or more previously rated browser extensions include machine executable instructions to determine whether the browser extension contains a reference to a same URL as one of the previously rated browser extensions.

28. The non-transitory machine-readable medium of claim 21, wherein the machine executable instructions to compare information associated with the browser extension include machine executable instructions to determine if first executable code of the browser extension refers to one or more of the same variable names referred to by second executable code of one of the previously rated browser extensions.

* * * * *